(12) United States Patent
Wang et al.

(10) Patent No.: US 7,529,459 B1
(45) Date of Patent: May 5, 2009

(54) ELECTRICAL RESET OF OPTICAL FUNCTIONS FOR TUNABLE FIBER OPTICAL DEVICES

(75) Inventors: Xingzhong Wang, Cupertino, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 12/136,744

(22) Filed: Jun. 10, 2008

(51) Int. Cl.
*G02B 6/00* (2006.01)
(52) U.S. Cl. ...................................... 385/140
(58) Field of Classification Search .................. None
See application file for complete search history.

(56) References Cited

U.S. PATENT DOCUMENTS 6,374,032 B1* 4/2002 Mao et al. .................. 385/140
7,197,225 B2* 3/2007 Romo et al. ............... 385/140

* cited by examiner

*Primary Examiner*—Omar Rojas
(74) *Attorney, Agent, or Firm*—Joe Zheng

(57) ABSTRACT

Control of attenuators used to regulate optical signals is disclosed. An assembly including an IR source and an IR sensor is provided to sense blockage of optical signals transmitted between two collimators via a fixed common light blocker that is driven by a motor. The motor is controlled to make sure that that the reset of the light blocker is properly done in an event in which a power supply is intentionally or incidentally cut off. An auxiliary power supply is provided to energize other parts in an attenuator should power supply is intentionally or incidentally cut off.

15 Claims, 8 Drawing Sheets

ELECTRICAL RESET OF OPTICAL FUNCTIONS FOR TUNABLE FIBER OPTICAL DEVICES

BACKGROUND OF THE INVENTION

1. Field of the Invention

The invention is generally related to the area of optical communications. In particular, the invention is related to a motor driven variable optical attenuator with IR sensor closed-loop control.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networks.

In general, the channel signals come from different sources and may have transmitted over different mediums, resulting in different power levels. Without equalizing the power levels of the channel signals that are to be combined or multiplexed, some channels in a multiplexed signal may be distorted as a result of various stages of processing the multiplexed signal. On the other hand, many optical devices or systems would not function optimally when incoming signals are beyond a predetermined signal level range. In fact, the power of the incoming signals shall not be too low, neither too high. To ensure that all optical devices or systems receive proper levels of optical signals, attenuation devices are frequently used to adjust the optical signals before they reach an optical device.

Electrically tunable optical devices are widely deployed in various fiber optical communication systems. An important feature in current tunable optical products is to allow a device to perform optically at a docking or reset position after its power supply has been cut off. For example, for an electrically controlled variable optical attenuator (EVOA), such a desired docking or resetting function can be a "dark" or "bright" attenuation state that satisfies the following requirements, respectively: when an applied external electric signal is turned off, the EVOA output is "dark" or "bright" thus exhibits a high or low attenuation to the input signal, respectively. Here the high or low attenuation typically has its quantifiable specifications and could be, for example, >30 dB or <1 dB, respectively. As another example, for an optical switch, this docking or resetting feature is often referred to as a non-latching function, meaning regardless of the switching state before the power off, the switch should return to a specific and predetermined switching state after the power is turned off accidentally or intentionally. Still as another example, in an tunable optical filter, this docking or resetting feature defines a fixed filter output spectrum location and shape within its tunability range.

Some optical devices allow such a reset function to be implemented in a straightforward way. For example, for a tunable optical device based on a micro-electro-mechanical-system (MEMS) platform, a designer may take advantage of various mechanical material and structure properties of the MEMS fabrication to design in a spring-loaded micro hinge to reset an optical actuator that performs the tuning. For this type of device, once its power is cut off, the MEMS micro hinge springs back the actuator to a reset state, thus implementing a predetermined reset function.

A prior art MEMS EVOA is sketched in FIG. 1 where only basic elements are illustrated. The actuator (not shown) of the EVOA could be an electrostatic mirror that responds to a driving voltage signal by tilting its angular position to deflect the input light to miss a part of the entire aperture of the output collimator, thereby causing various light attenuations. In the MEMS EVOA design of a "dark" reset feature, a micro spring-loaded hinge is used so that the mirror's relaxed position is an off-angle position where an optical alignment will not allow the mirror reflected light to enter the EVOA's output port. Only when certain control signals are applied to overcome the spring force, can the VOA be tuned to have specific attenuation as the entire collimated beam is aimed at the output aperture. On the other hand, for a "bright" reset feature implementation of a MEMS EVOA, one can choose the spring relaxed position to be the one with the right alignment so that all the light can be reflected by the mirror into the output collimator aperture.

Many existing tunable optical devices, however, have no such a feature that can be easily implemented with a micro spring-loaded hinge, but they offer other advantages that a MEMS platform does not perform well, such as good repeatability, good device tuning resolution and robust performance against harsh environment where the so-called temperature-dependent loss (TDL) is a main specification to differentiate. Thus, in order for these non-MEMS based technologies to be implemented with the reset features, other methods must be incorporated and integrated.

In the current invention, we disclose techniques to artificially enforce a reset function triggered by a power cut-off and apply it to various non-mechanical spring-based actuators used for various tunable optical devices. In particular, the current invention can be effective for two classes of applications where 1) either a detent force such as a magnetic force can be employed to help reset or 2) no such detent force of any kind exists but such a reset is still in order.

BRIEF DESCRIPTION OF THE DRAWINGS

These and other features, aspects, and advantages of the present invention will become better understood with regard to the following description, appended claims, and accompanying drawings where:

FIG. 8 shows a sequence of power vs. time events, where the dotted line is for an auxiliary power and it is turned on

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2-8. However, those skilled in the art will readily appreciate that the detailed description given herein with respect to these figures is for explanatory purposes as the invention extends beyond these limited embodiments.

Figure 1:
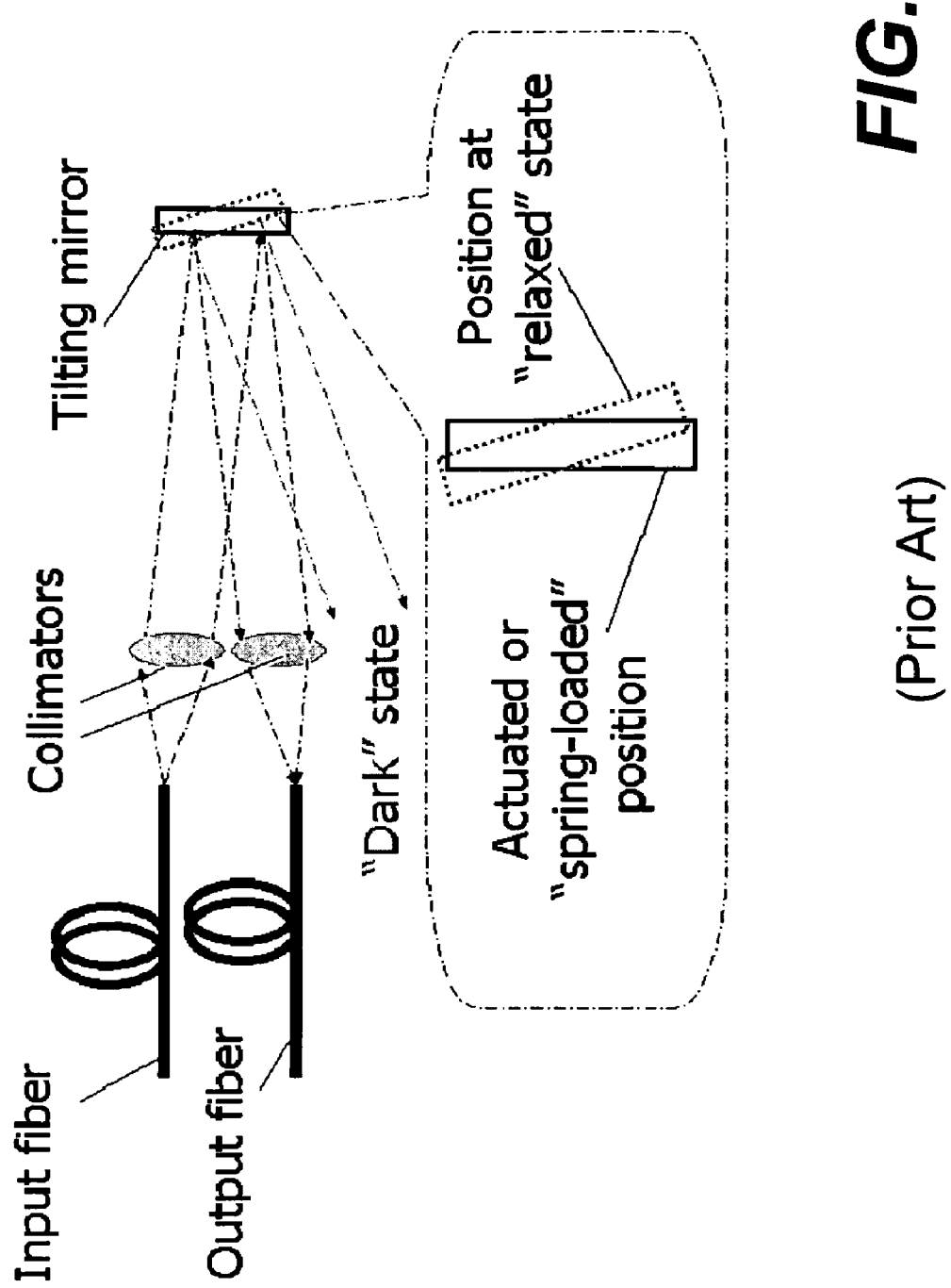
FIG. 1 shows a prior art MEMS EVOA.
Figure 2:
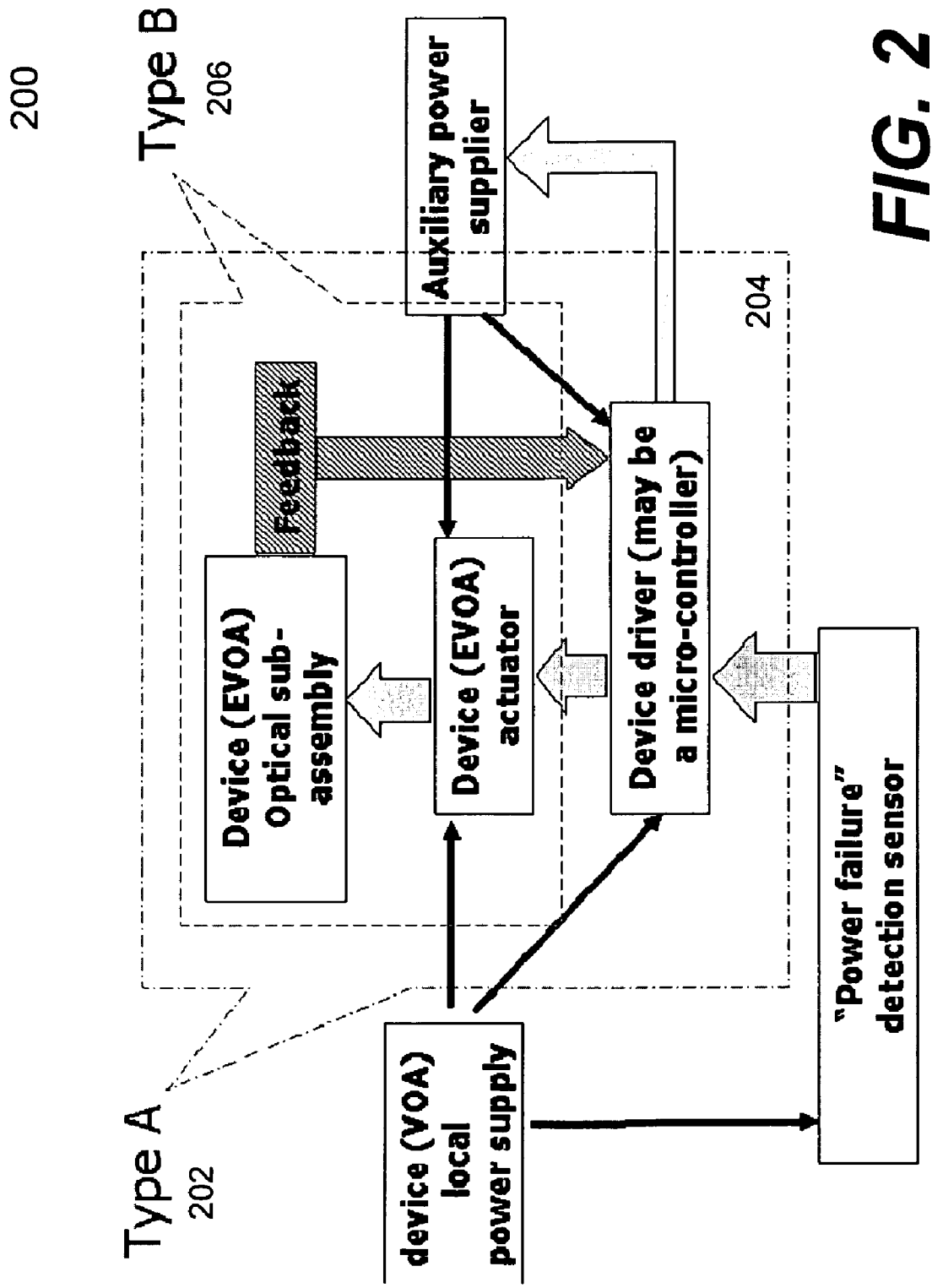
FIG. 2 shows a functional block diagram of an attenuation system 200 according to one embodiment of the present invention.
Figure 3:
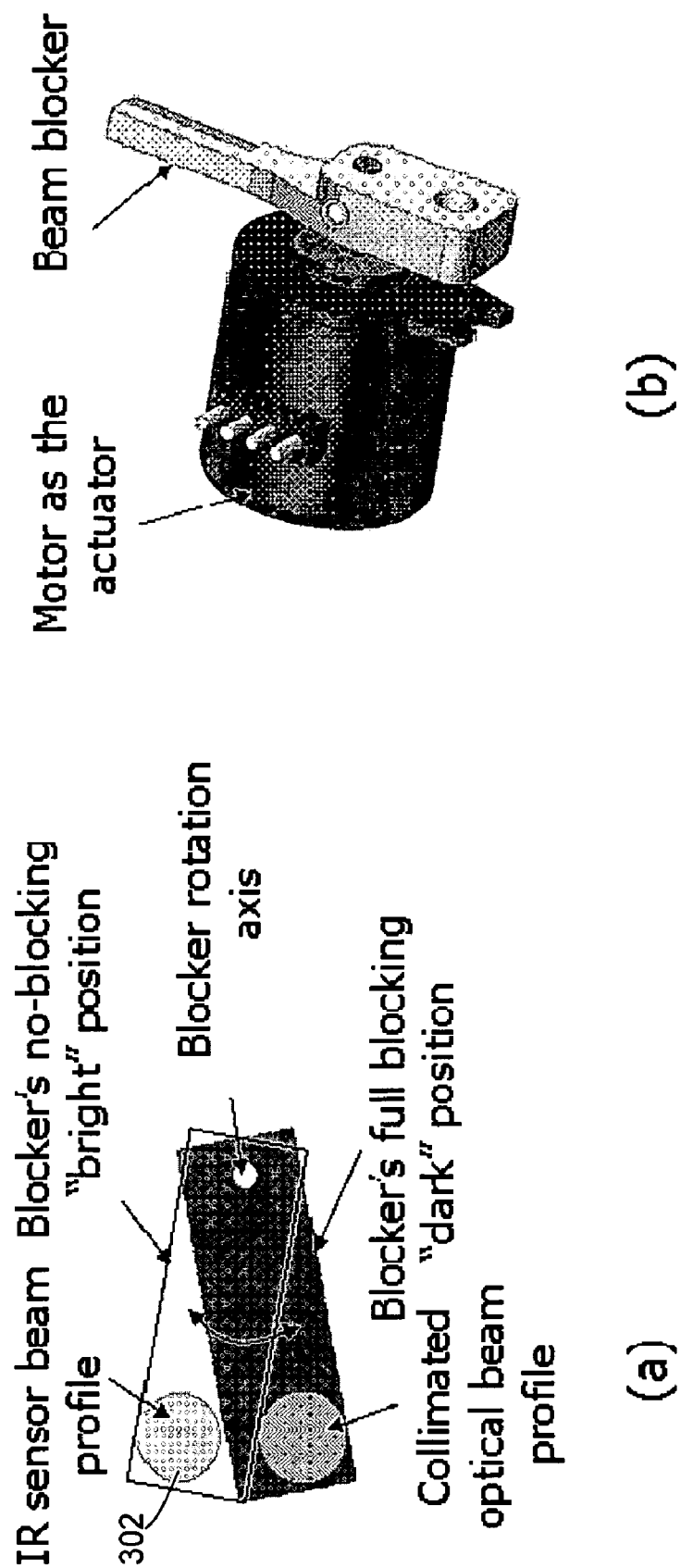
FIG. 3A shows a controlled beam-blocking principle of an EVOA according to one embodiment of the present invention.
FIG. 3B depicts a corresponding 3D drawing of a rotational light blocker actuated by an electric stepping motor that may be used in FIG. 3A.
Figure 4:
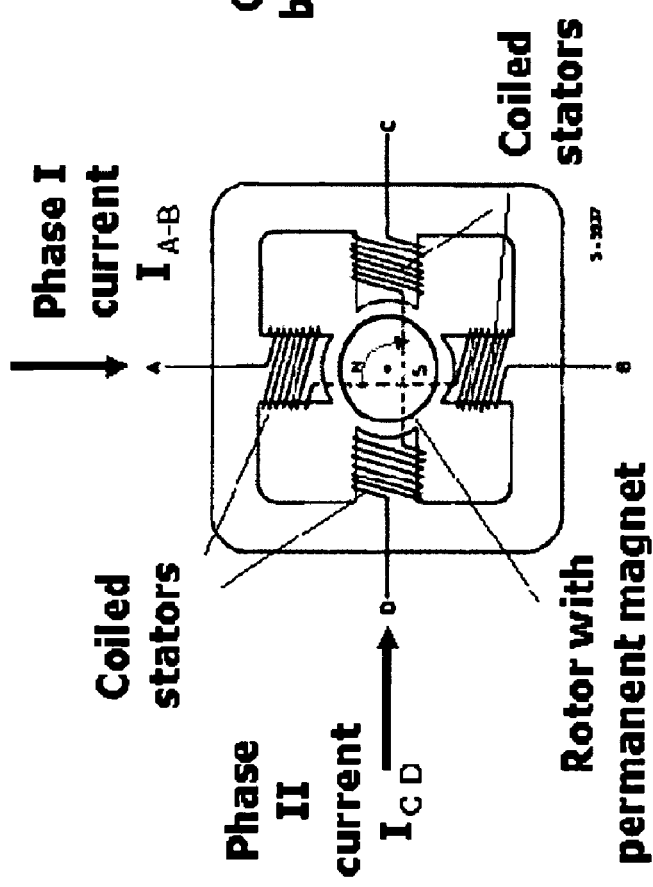
FIG. 4A and FIG. 4B are provided to show how a basic motor operates and thus what needs to be done to reset it to a position and lock it there.
Figure 4:
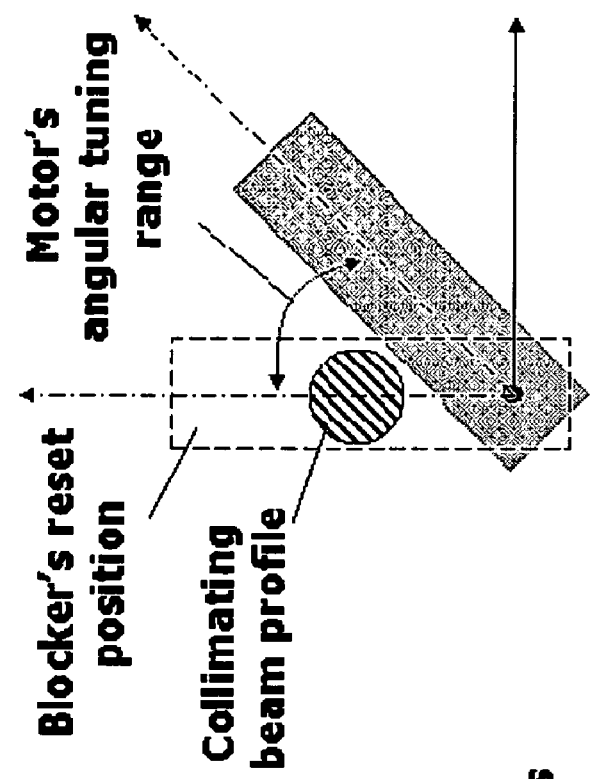

FIG. 2 shows a functional block diagram of an attenuation system 200 according to one embodiment of the present invention. There are at least two types of optical tunable devices that may benefit from our disclosed "artificial rest" function. Type A device, shown within the larger dotted line box 202, is a digitally controlled EVOA that has an on-board micro-controller and may even have a close-loop feed-back mechanism that can feed back some optical performance parameters to the device driver 204 which may contain a micro-controller (not shown). A Type B device, shown in the smaller dotted line box 206 is a more basic version and has no digital interface and may or may not have any optical performance monitor as its feedback. In the figure, the solid lines with arrows indicate power lines while block arrows denote the control or feedback signals.

A Type A device already has an on-board device driver 204 that may or may not include a micro-controller, it is relatively easier than a Type B device to implement the artificial reset function. It should be noted that due to the fact that a Type A device has no natural spring like reset-force upon losing its power supply. Thus, to trigger an artificial reset operation, one does need to borrow "energy" from other places, electrically, mechanically or otherwise. In the present invention, we disclose a mechanism that has such borrowed "energy" to be electrical through an auxiliary power supply which is not an ordinary power supply connected to the EVOA device. Such an auxiliary power supply can be in the form of a battery power (e.g. a rechargeable battery), or electrical energy released by a circuit, e.g. through a brief discharge from an capacitive or inductive circuit, or a separate power line that guarantees power supply. According to another embodiment, a power failure detection sensor or circuit is used and in general, commercially available in various forms and. In the event of a power failure, the power failure detection circuit first detects the event and sends a signal to the device driver that triggers the switch "on" to use the auxiliary power supply to energize other EVOA sub-components that need to use electrical power. The device driver also sends control commands to instruct the actuator to be tuned to the reset or a docking location.

For a Type B device, the basic principle of the "artificial reset" is identical but one needs to add on an additional device driver into the system in order for the sequence of sub-operations previously described to be executed. In the following sections, we discuss two specific embodiments of the invention, one for each of the Tape A and Type B devices.

FIG. 3A shows a controlled beam-blocking principle of an EVOA according to one embodiment of the present invention. As illustrated, a rotational mechanical arm rotates in and out of a collimated optical beam to either block the light or let it go through between a pair of fiber collimators. To better understand the present invention, an IR sensor beam profile 302 is shown. What is important is that for a "dark" or "bright" reset, one must artificially force the motor to rotate to a reset position as shown as in either a down position or an up position. FIG. 3B basically depicts a 3D drawing of a rotational light blocker actuated by an electric stepping motor. It is well known that an electric motor, such as a stepping motor is a latching kind of actuator that has no reset position. But the motor has typically a strong detent force to help it maintain its stopping position once its power is cut off. In order to force an electric motor to reset to a predetermined angular position, we invented an effective way to enforce a pre-shut-down motor resetting action to park the motor's shaft at a predetermined angular position.

To understand how this pre-shut-down motor resetting action, FIG. 4A and FIG. 4B are provided to show how a basic motor operates and thus what needs to be done to reset it to a position and lock it there. In FIG. 4A, as a simple example, we show a 4-step motor case where the rotor contains a permanent magnet while there are two groups of stators formed by coils which can provide alternating magnetic fields that induce the rotor to respond by a rotational motion. The current injected to the stators are in two phases as shown: $I_{A-B}$ and $I_{C-D}$, respectively. One important feature of the motor is that if one only applies a current (e.g., $I_{A-B}$) to one of the two phases, the rotor will not be able to rotate and will park in a position, say vertically such as what is shown in the figure. The other important feature of the motor is that once no current is applied, stators basically are deactivated and thus the rotor will be staying at a position where it lands and will not move unless there is a large external impact to overcome its so-called detent force (by permanent magnet's attraction force). The third important feature of the motor is that the motor's angular position within each step, say within each of the 90 degree quadrants in the current 4-step motor situation, can be precisely controlled by the phase current differentials and basically acts as an analog device. FIG. 4B depicts an exemplified situation where one can define the rotor's 90 degree version position to be the position of reset once only the phase current ($I_{A-B}$) being applied to the motor in FIG. 4A situation. One can place the optical subassembly thereon so that the collimated beam profile is completely blocked in this predetermined motor shaft angular position. Thus, once a pre-shut-down action allows this current ($I_{A-B}$) only application, one can implement the docking position for a "dark" VOA state or a bright VOA state if one selects to align the collimating beam profile to be completely out of this 90 degree vertical position of the light beam blocker. In reality, a stepping motor contains a lot more than 4 steps in order to make a smooth angular operation. Many commercial low cost stepping motors can have more than 20 steps, implying it has many angular oriented separate groups of stators.

Based on the motor's unique features, the "artificial" reset to form "dark" or "bright" EVOA state is electronically designed to borrow power from an auxiliary power supply. In the specific embodiment described below, one form of such auxiliary power can come from a charged capacitor in circuits dedicated as a transient power supply. When the device power is cut off, a power failure detection quickly detects the "event" and triggers an action to use the slower response of the discharged power from the capacitor to cut off the current supply to one phase of the motor, say Phase II or the $I_{C-D}$ while using the discharged power to make a temporary surge to supply the other phase of the motor, say Phase I. or the $I_{A-B}$, as shown in the example in FIG. 4A. Such a sequence of actions can be appreciated in a timing diagram shown in FIG. 5. It may be appreciated to those skilled in the art that the phase current transient differential will cause the motor to respond to docking its rotor to a predetermined phase angle, e.g. the vertical angle for the example shown in FIG. 4A. As the Phase B current vanishes, such a reset or docking should have been completed and motor shaft will be locked by its detent force to the docking position.

Figure 5:
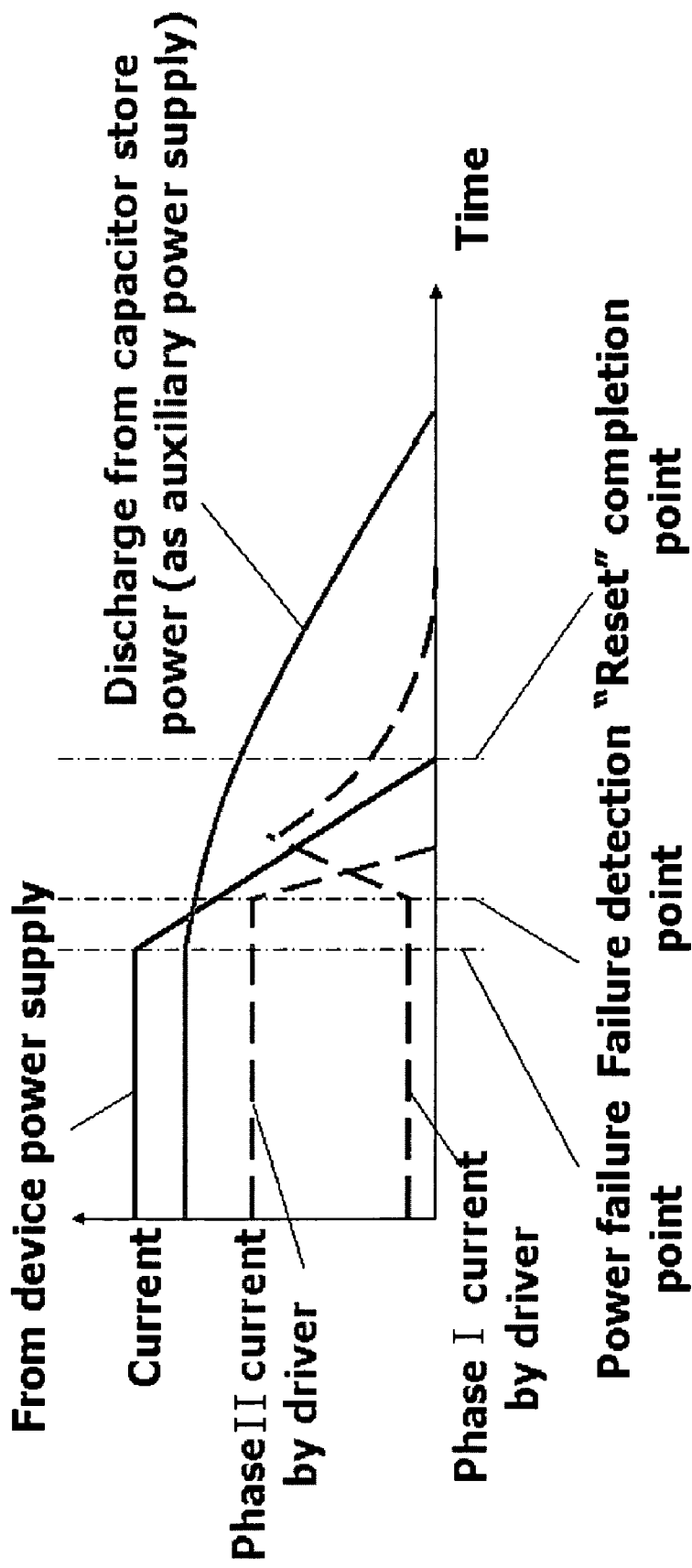
FIG. 5 shows a timing diagram of a sequence of actions.

FIG. 5 shows an exemplary circuit design used to implement the desired operation. Also, such design and design variations are possible to be adapted to motors other than a 4-step stepping motors. One such design that uses a MOSFET and a capacitive circuit is shown in FIG. 6 as an example.

Figure 6:
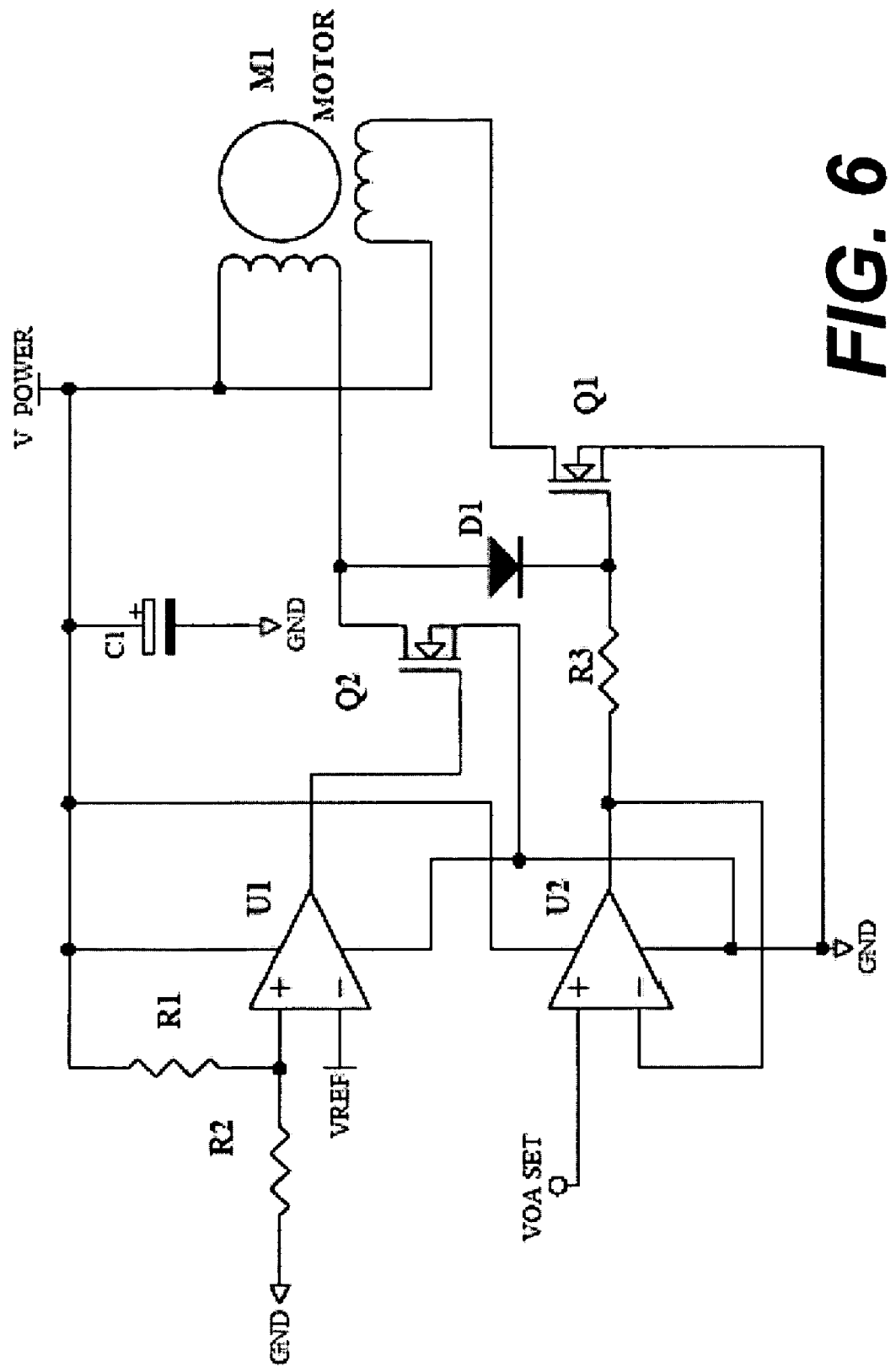
FIG. 6 shows an exemplary capacitive circuit of using a MOSFET to control a motor.

In FIG. 6, there are two operational amplifiers U1 and U2 which drive the two motor phases through two MOSFETs Q1 and Q2 respectively. U1 is used as a voltage comparator which detects the power failure by comparing the power supply voltage (V POWER) with a fixed reference voltage (VREF). U2 is used as a linear amplifier which controls the motor rotor position. Once the power supply voltage is below a threshold (decided by the voltage reduction of R1 and R2), U1 will cut off Q2 (motor phase II). Due to the existing of R3, the output of U2 is blocked at this time through the diode D1, so the cutting of Q2 forces the opening of Q1 (rising current of phase I) regardless of the EVOA set voltage at the input of U2. These circuit actions are powered by the residual energy stored in a large capacitor C1 after the power supply is cut off. Other similar circuits of realizing this sequence of actions are possible but will not be listed here.

There are still other tunable optical technology platforms that could not benefit from an intra-step motor actuations that still needs to enforce a rest operation upon power failure. For example, for a neutral density (ND) filter based EVOA whose motor based actuator needs to operate in many complete 360 degree rotations (not within only one portion of a single resolution), an artificial rest is still being demanded as a feature. Once can not thus borrow the transient power stored by a capacity circuit as an auxiliary power supply. In such a case, a true secondary power supply which could be either a battery (including a charged battery) or another alternative but guaranteed power supply will need to be used.

In this case, one may have to use digital methods with additional hardware or software means to create a "pre-shutdown" action to force the actuator to park to a desired position before completely turning of all power. This is the system we previously described as Type B in FIG. 2. To implement the reset, one must allow to include a digital driver as well as a longer-lasting auxiliary power supply.

Figure 7:
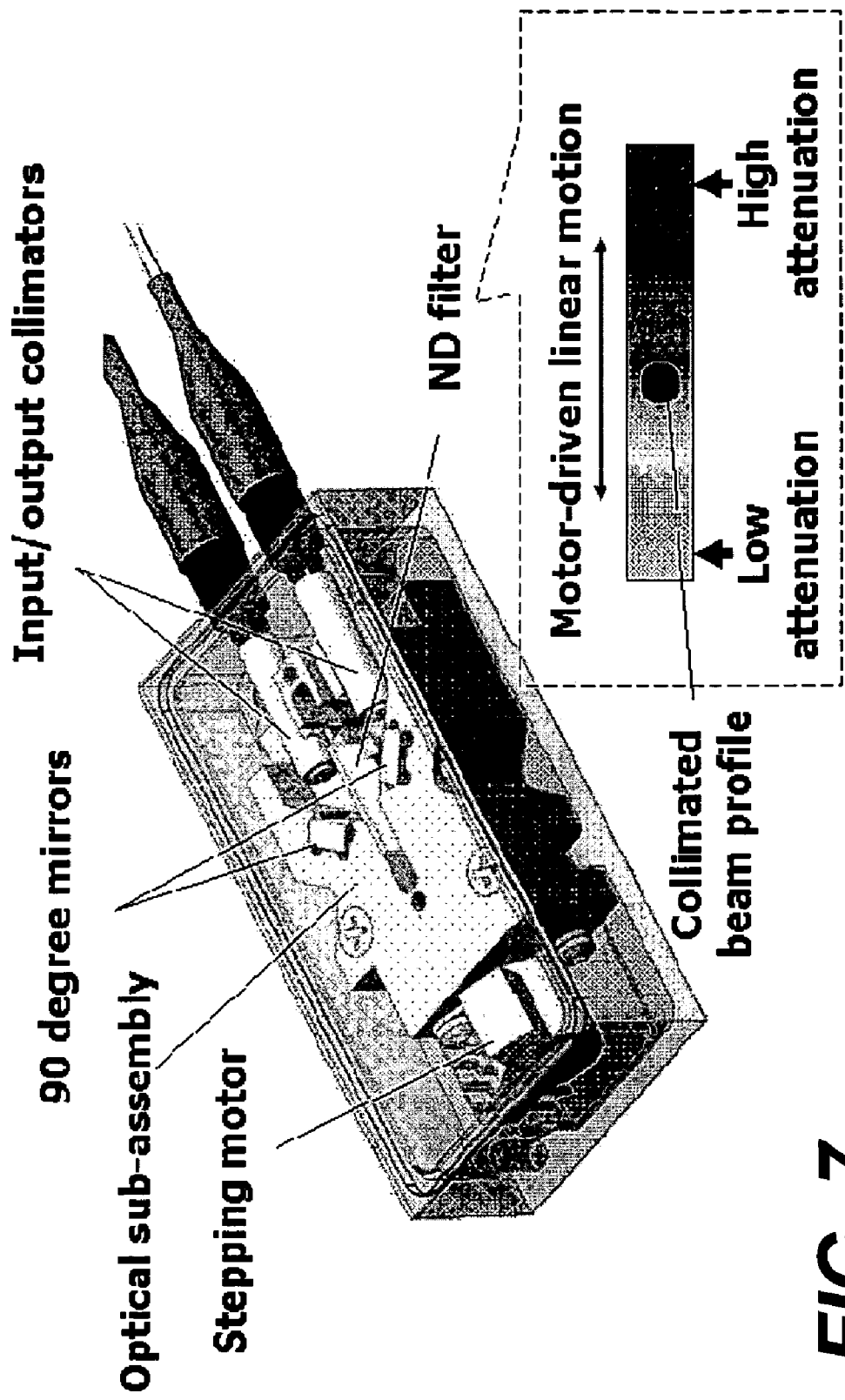
FIG. 7 shows an embodiment using an ND filter-based EVOA to realize a reset function implementation.

FIG. 7 shows an embodiment using a ND filter based EVOA to realize this reset function implementation a motor-driven and ND filter based EVOA uses a mechanical subassembly that includes a stepping motor and a lead-screw based transmission system to convert the motor's rotating motions to a linear motion that in turn drives an elongated ND filter whose light absorption changes monotonically from one end to the other. The scannable ND filter is placed between a pair of optical collimators through a pair of 90 degree folding mirrors to attenuate the device output light intensity. A balance is needed between the ND filter's achievable attenuation resolution per length of travel to how fine the mechanical linear motion that the lead-screw-based transmission subassembly. Thus, the change of attenuation from "bright" to "dark" may not have the speed as fast as that from a light blocker type EVOA we previously described. In particular, to scan through the entire length of a typical ND filter, many turns of motor revolutions are needed vs only a small fraction of one turn that the light blocker type would require for the motor to reset.

To enforce a reset of the ND filter type EVOA given any operating situation, the use of surged power released from a capacitor discharge is most likely insufficient. Thus, a battery powered or a true back-up power supply is essential here. The driver circuit again will react from a signal from the power failure detection sensor to switch on the back-up power and at the same time to issue instructions to send a command to the motor as an actuator so that the motor will continue to run on back-up power till it reaches the ND filter reset position before the auxiliary power is turned off.

Figure 8:
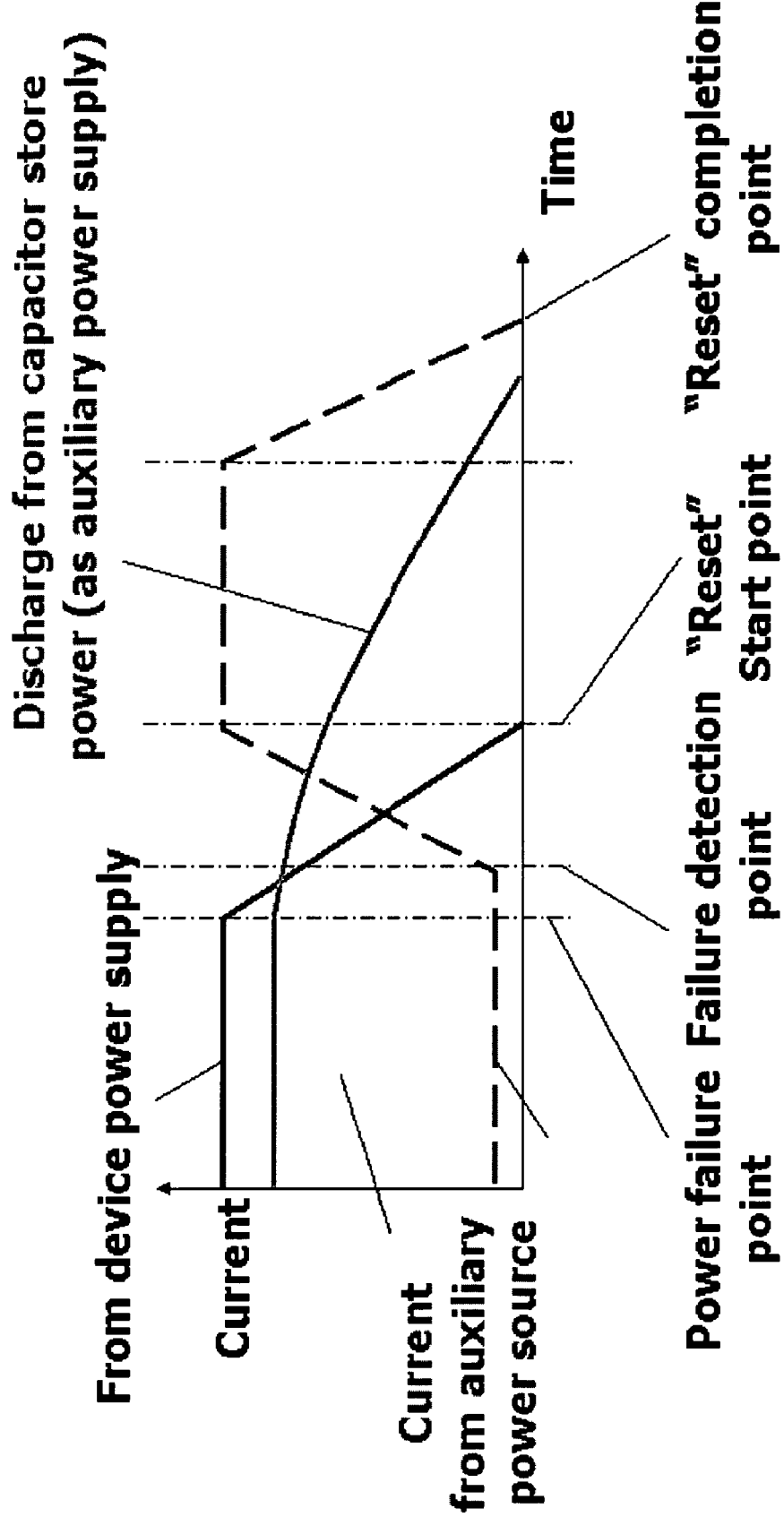

Such a sequence of power vs. time events is shown in FIG. 8 where the dotted line is for the auxiliary power and it is turned on after the failure detection circuit determines a failure and the power will remain on till the rest position of the ND filter is reached. Such as reset position, in general, can be confirmed through EVOA's attached feedback mechanism, e.g. a potentiometer is often used as the feedback signal generator for ND filter based EVOA. Then the driver can act to turn off the auxiliary power supply and use the transmission's friction force together with the motor detent force to lock the ND filter's position to the reset state.

The present invention may be implemented as a method, an apparatus or a part of a system. According to one embodiment, the present invention is a method for enforcing a reset in a non-mechanical spring-based actuator used in an optical attenuation system, the method comprising: detecting if a power supply is being cut off accidentally or intentionally; turning on an auxiliary power supply to continue energizing other components in the actuator; and sending a control command to instruct the actuator to be tuned to a reset position or a docking location.

According to another embodiment, the present invention is an electrically controlled variable optical attenuator comprising: an assembly structure including an IR source and an IR sensor; a light blocker actuated by a motor to block some or all of a light beam being projected from an input collimator to an output collimator according to an attenuation requirement, where a movement of the light blocker is sensed by a sensing assembly to indicate how much the light beam has been attenuated; and a control mechanism to cause the light blocker to be tuned to a reset position or a docking location.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a variable neutral density filter may be used as a light blocker or replaced by another device that can strengthen an optical signal. Accordingly, the scope of the present invention is defined by the appended claims rather than the foregoing description of embodiments.

What we claim:

1. A method for enforcing a reset in a non-mechanical spring-based actuator used in an optical attenuation system, the method comprising:
   detecting if a power supply is being cut off accidentally or intentionally;
   turning on an auxiliary power supply to continue energizing other components in the actuator; and
   sending a control command to instruct the actuator to be tuned to a reset position or a docking location, wherein the auxiliary power supply is a battery, electrical energy discharged from a circuit, or a separate power line that guarantees a power backup all the times, said detecting is performed by a power failure detection circuit, in an event of the power supply being lost, the power failure detection circuit first detects the event and sends a signal to a device driver that triggers the auxiliary power supply to energize other components in the actuator that needs to be powered, and at the same, the device driver is configured to send a control command to instruct the actuator to be tuned to a reset position or a docking location.

2. The method as recited in claim 1, wherein the actuator drives a rotational mechanical arm that is caused to rotate so as to block or pass a collimated optical beam going through between a pair of fiber collimators.

3. The method as recited in claim 2, wherein the actuator is based on a stepping motor that has no reset position, a strong detent force is utilized to maintain a stopping position thereof once a power supply thereto is off.

4. The method as recited in claim 3, wherein in order to force the motor to stop at a predetermined angular position, a circuit is employed to cut off a current being supplied to the motor so as to enforce a pre-shut-down motor resetting action to park a shaft of the motor at a predetermined angular position.

5. The method as recited in claim 4, wherein the rotational mechanical arm is mounted onto the shaft of the motor.

6. The method as recited in claim 4, wherein the circuit includes two operational amplifiers which respectively drive two motor phases through two MOSFETs Q1 and Q2.

7. The method as recited in claim 6, wherein one of the operational amplifiers is used as a voltage comparator, and another one of the operational amplifiers is used as a linear amplifier.

8. An electrically controlled variable optical attenuator comprising:
   an assembly structure including an IR source and an IR sensor;
   a light blocker actuated by a motor to block some or all of a light beam being projected from an input collimator to an output collimator according to an attenuation requirement, where a movement of the light blocker is sensed by a sensing assembly to indicate how much the light beam has been attenuated; and
   a control mechanism to cause the light blocker to be tuned to a reset position or a docking location, wherein the control mechanism comprises:
      a power failure detecting circuit to detect if a power supply is being cut off accidentally or intentionally;
      means for turning on an auxillary power supply to continue energizing other components in the attenuator; and
      means for sending a control command to cause the light blocker to be tuned to a reset position or a docking location.

9. The attenuator as recited in claim 8, wherein the auxiliary power supply is a battery, electrical energy discharged from a circuit, or a separate power line that guarantees a power supply all the time.

10. The attenuator as recited in claim 8, wherein, in an event of the power supply being lost, the power failure detection circuit first detects the event and sends a signal to a device driver that triggers the auxiliary power supply to energize other components in the attenuator that need to be powered, and at the same, the device driver is configured to send the control command to cause the light blocker to be tuned to a reset position or a docking location.

11. The attenuator as recited in claim 10, wherein the motor is a stepping motor that has no reset position, a strong detent force is utilized to maintain a stopping position thereof once a power supply thereto is off.

12. The attenuator as recited in claim 11, wherein in order to force the motor to stop at a predetermined angular position, a circuit is employed to cut off a current being supplied to the motor so as to enforce a pre-shut-down motor resetting action to park a shaft of the motor at a predetermined angular position.

13. The attenuator as recited in claim 12, wherein the rotational mechanical arm is mounted onto the shaft of the motor.

14. The attenuator as recited in claim 13, wherein the circuit includes two operational amplifiers which respectively drive two motor phases through two MOSFETs Q1 and Q2.

15. The attenuator as recited in claim 14, wherein one of the operational amplifiers is used as a voltage comparator, and another one of the operational amplifiers is used as a linear amplifier.

* * * * *